UNITED STATES PATENT OFFICE.

ALICE A. MOORE, OF VANCOUVER, BRITISH COLUMBIA, CANADA.

COMPOSITION OF MATTER TO FACILITATE THE WHIPPING OF CREAM.

1,287,395.  Specification of Letters Patent.  Patented Dec. 10, 1918.

No Drawing.  Application filed April 17, 1918. Serial No. 229,181.

*To all whom it may concern:*

Be it known that I, ALICE A. MOORE, a citizen of the Dominion of Canada, residing at Vancouver, in the Province of British Columbia, Canada, have invented a Composition of Matter to Facilitate the Whipping of Cream, of which the following is a specification.

This invention relates to a composition of matter which, when added to cream, will facilitate the whipping of it, and will impart to the froth of the cream so whipped, a relative permanency in that state.

Difficulty is experienced in whipping cream unless it has a certain high percentage of butter fat, and even after the desired froth has been produced, it has frequently no stability in that condition but subsides quickly to its original liquid form.

It is to overcome these difficulties and enable a cream having a relatively low percentage of butter fat to be used, that the composition, which is the subject of this application, has been made.

The invention comprises an acid solution thickened with any suitable material to approximately the consistence of whipping cream. The acid used is preferably a fruit acid or one derived from organic matter, such as citric, tartaric or acetic acid.

In practice I have used two parts by bulk of lemon juice with one part of citric or tartaric acid and have thickened it with two parts of corn starch, but the thickening should be such as will not interfere with the pouring of it from the vial in which it may be kept. Any suitable flavoring may be used, but preferably essence of lemon where lemon juice is the acid solution.

This thickened acid solution, when added to and thoroughly mixed with the cream to be whipped in the approximate proportion of one teaspoonful to a quart of cream, has the effect of facilitating the frothing of it, and the froth, when produced, is relatively permanent irrespective of the temperature within reasonable limits to which it is exposed.

Although I originally used and prefer lemon juice, I do not desire to be confined to such as a solution of citric acid or of tartaric acid may be used alone, instead, provided the strength of the acid solution is maintained approximately the same as when one part of citric or tartaric acid is added to two parts of lemon juice.

When I speak of an organic acid in the claims of this application, I desire it understood that that term refers only to such organic acids as contained in lemon juice, or tartaric acid, or citric acid.

What I claim is:

1. A composition of matter to facilitate the whipping of cream and to render it stable in the whipped condition, said composition comprising substantially one part by bulk of tartaric acid to two parts of lemon juice and two parts of a suitable carbohydrate.

2. A composition of matter for the purpose specified, comprising one part by bulk of tartaric acid, two parts of lemon juice and two parts of corn starch.

3. A composition of matter for the purpose specified which comprises a solution of an edible weak organic acid suitably thickened to approximately the consistency of the cream with which it is to be used.

ALICE A. MOORE.

Copies of this patent may be obtained for five cents each, by addressing the "Commissioner of Patents, Washington, D. C."